United States Patent [19]

Harshman

[11] Patent Number: 5,072,582

[45] Date of Patent: Dec. 17, 1991

[54] SCRAMJET COMBUSTOR

[75] Inventor: Daniel L. Harshman, Forest Park, Ohio

[73] Assignee: General Electric Company, Cincinnati, Ohio

[21] Appl. No.: 327,831

[22] Filed: Mar. 23, 1989

[51] Int. Cl.$^5$ ............................ F02K 7/10; F02K 7/14
[52] U.S. Cl. ........................................ 60/270.1; 60/740
[58] Field of Search .................... 60/270.1, 734, 740, 60/742, 271

[56] References Cited

U.S. PATENT DOCUMENTS

| | | | |
|---|---|---|---|
| 3,535,882 | 10/1970 | Tizio et al. | 60/271 |
| 3,667,233 | 6/1972 | Curran et al. | 60/270 |
| 3,864,907 | 2/1975 | Curran | 60/270.1 |
| 3,974,648 | 8/1976 | Kepler | 60/270.1 |
| 4,291,533 | 9/1981 | Dugger et al. | 60/270.1 |
| 4,835,971 | 6/1989 | Romey et al. | 60/740 |

FOREIGN PATENT DOCUMENTS

| | | |
|---|---|---|
| 1040444 | 8/1966 | United Kingdom . |
| 1268515 | 9/1969 | United Kingdom . |
| 2216855 | 10/1989 | United Kingdom . |
| 2222635 | 3/1990 | United Kingdom . |

OTHER PUBLICATIONS

Short Course in Hypersonics, Aug. 19-22, 1986, State University of New York at Buffalo.
Preliminary Results of Arc Tunnel Testing of Two-Dimensional Supersonic Combustors, by D. E. Nieser and M. J. Kenworthy, General Electric Flight Propulsion Division's Feb. 1966 Report No. R66FPD57.
Experimental Performance of the CIM II Scramjet Engine at Mach 7, by W. Hoelmer and R. C. King, General Electric Aircraft Engine Group's May, 1968 Report No. R68AEG257.
Combustion in a Supersonic Flow, by V. K. Bayed, et al, Gorenie v Sverkhzvukovom Potke, Publishing House "Nauka", Novosibirsk, USSR.

Primary Examiner—Michael J. Carone
Attorney, Agent, or Firm—Douglas E. Erickson; Jerome C. Squillaro

[57] ABSTRACT

A scramjet combustor for a hypersonic (Mach number greater than about 5.5) flight vehicle. The combustor housing has two spaced-apart, generally opposing, and longitudinally extending walls. Each wall has an aft-facing step. Fuel (such as hydrogen) is injected at the step into the shear zone along the separation line for better fuel-air mixing. The longitudinal distance between the steps is controlled to take advantage of aerothermo compression provided by the forward step's shock. The back portion of each wall is positioned transversely inward toward the combustor's longitudinal axis to improve mixing effectiveness for more efficient combustion.

4 Claims, 2 Drawing Sheets

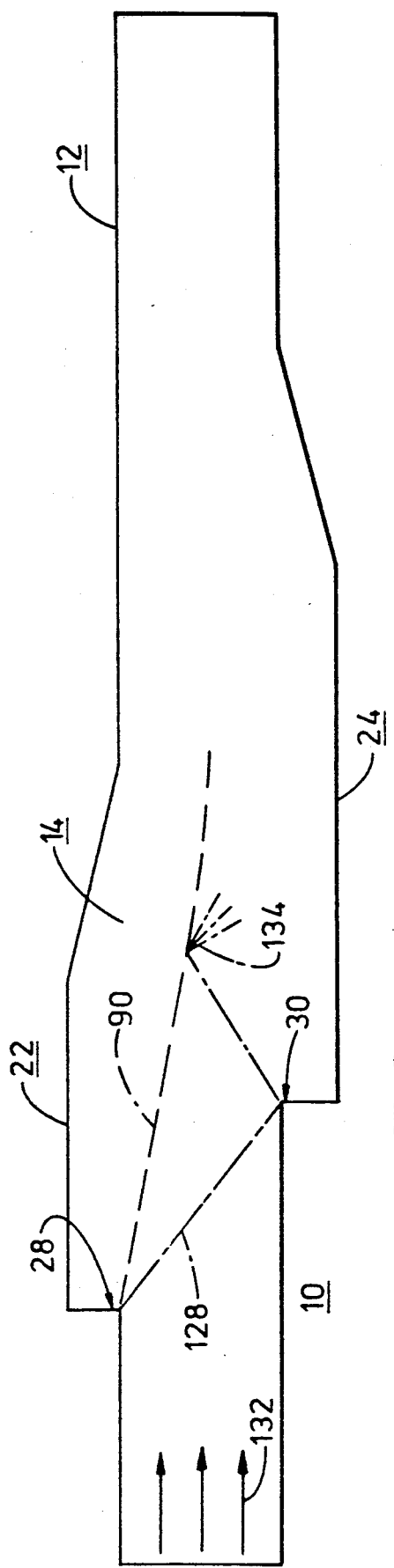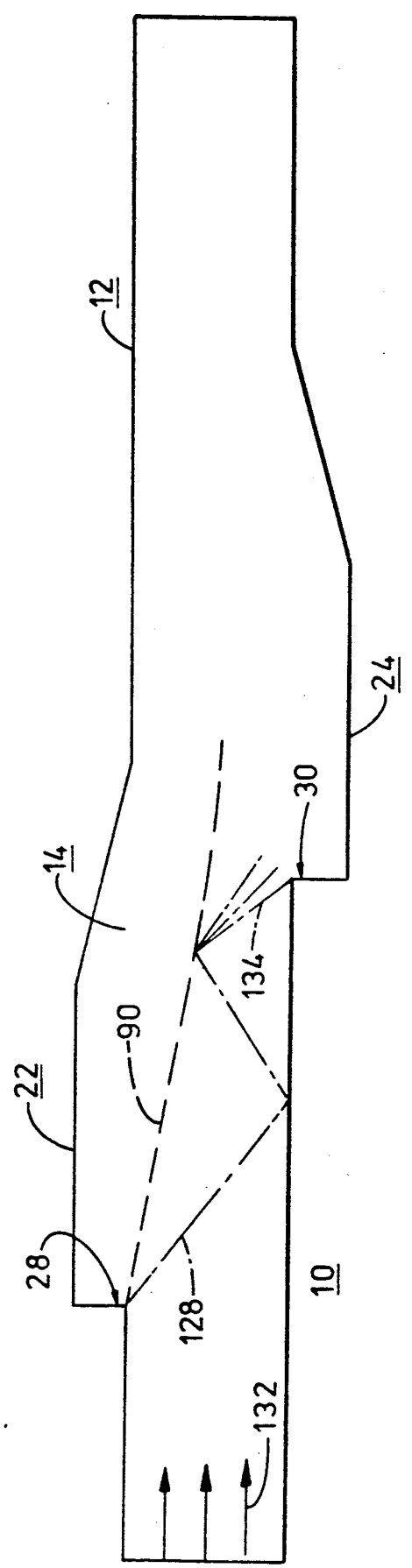

SCRAMJET COMBUSTOR

BACKGROUND OF THE INVENTION

The present invention relates generally to a scramjet combustor for a supersonic flight vehicle and more particularly to a scramjet combustor having improved combustor efficiency and to a method for its operation which optimizes combustor performance.

Although the theory of scramjet engines has been well known for many years, and although supersonic combustors have been tested in the laboratory, no scramjet engine is believed to have ever been successfully flown. Recent advances in technology, such as in high temperature materials, have made scramjet engines ready for implementation in the next generation of high speed aircraft. Such aircraft will be capable of flying at hypersonic speeds (i.e., speeds having Mach numbers greater than about 5.5). Hypersonic flight vehicles have been proposed which incorporate scramjet engines to achieve high Mach numbers. Once such a vehicle has achieved a sufficient speed by some other propulsive means (which may include a turbojet engine), a scramjet engine takes over to propel the aircraft to high Mach numbers (typically between Mach 6 and Mach 20). Such high Mach numbers cannot be achieved by any other known type of air-breathing engine.

A typical scramjet engine includes a combustor having a chamber, wherein a fuel-air mixture moving at supersonic speed is burned, and having at least one fuel injector which directs supersonically-moving fuel (such as pressurized hydrogen) into the chamber. The engine also includes an air inlet, which delivers compressed supersonically-moving air to the combustor chamber, and includes an exhaust nozzle, which channels the burning gases out of the combustor chamber to produce engine thrust. The fuel injectors are the nozzle parts of the combustor to which fuel is delivered by a fuel system which may include tanks, pumps, and conduits.

An important component of the scramjet engine is its combustor. The basic scramjet combustor of the literature includes a longitudinally-extending rectangular duct which defines the combustor chamber. The combustor's fuel injectors inject fuel into the combustor chamber through openings in the duct's two opposing larger walls. The longitudinally-moving air, from the engine inlet, and the typically longitudinally-or-transversely-injected fuel, from the fuel injectors, mix in the combustor chamber. In the case of hydrogen fuel, the fuel-air mixture in the combustor chamber will have a high enough temperature and pressure to auto-ignite.

The efficiency of burning within the combustor depends in part on how well the air and fuel mix. To promote mixing, a scramjet combustor disclosed in the literature has included angled fuel injection which means that the injected fuel is not parallel or perpendicular to the longitudinally-moving air. Another approach disclosed in the literature to promote better fuel-air mixing and burning stability has included an aft-facing step in one of the larger walls with (or without) the addition of angled fuel injection at the step location. An additional scramjet combustor, disclosed in the literature without elaboration, has included an aft-facing step in each larger wall, with the steps being a longitudinal distance apart.

The efficiency of burning within the combustor also depends in part on how much the air in the fuel-air mixture is compressed (increase in static pressure). The more the air can be compressed (within the limit of temperature at which the air dissociates) before the fuel-air mixture is burned, the more efficient and powerful the scramjet engine will be. The air compression disclosed in the literature has been accomplished by the rectangular, funnel-like inlet portion of the engine which leads from the engine inlet's entrance, where the engine inlet opening is largest, to the engine inlet's throat, where the engine inlet opening is smallest. The inlet of a scramjet engine may have fixed or variable geometry. Variable geometry means that the engine throat area may be changed, and there is an optimal throat area for any given set of flight conditions, as is known to those skilled in the art. A scramjet with a variable geometry engine inlet can operate, and operate more efficiently, over a greater range of flight conditions than can a scramjet with a fixed geometry engine inlet. However, if the inlet throat area is made too small, air boundary layer instability or choking (reducing the airflow to sonic speed) in the inlet throat will exist, causing inlet unstart. This means that if the inlet compresses the air too much (because of a too small throat area) at lower Mach numbers, the scramjet engine cannot be started.

Although scramjet combustor designs have been proposed which increase combustor efficiency, none are known which optimize combustor efficiency by optimizing the parameters of step separation, fuel injection angle, and wall separation for design (cruise) flight conditions. Also, no scramjet combustors are known which are self-adaptive for such parameters. This means none are known to have variable geometry for such parameters enabling their configurations to be changed during supersonic flight to maintain optimized combustor efficiency during changes in flight conditions. Changes in flight conditions include, for example, changes in the combustor inlet Mach number during the acceleration-to-cruise phase of a flight.

SUMMARY OF THE INVENTION

It is an object of the invention to provide a scramjet combustor having improved burning efficiency for design flight conditions.

It is another object of the invention to provide a variable geometry scramjet combustor which can change its configuration during supersonic flight to maintain improved burning efficiency for off-design flight conditions.

It is a further object of the invention to provide a method for operating such a variable geometry scramjet combustor to optimize burning efficiency over a range of flight conditions.

There is provided by the invention described herein a scramjet combustor having first and second spaced-apart, generally opposing, and generally longitudinally extending walls, with each of the walls having an aft-facing step with the step of the second wall spaced longitudinally apart and aft of the aft-facing step of the first wall. The scramjet combustor of the invention, optimized for the step separation parameter, has the longitudinal distance between the aft-facing steps generally between a minimum and a maximum value. At the minimum value, the shock from the step of the first wall, at the scramjet combustor's design inlet Mach number and fuel-air ratio, will strike the second wall proximate and longitudinally forward of the aft-facing step of the second wall. At the maximum value, the shock from the step of the first wall, at the scramjet combustor's design inlet Mach number and fuel-air ratio, will reflect off the second wall and then reflect off the separation line emanating from the longitudinally forward step, as an expansion fan whose initial expansion wave will strike the second wall proximate and longitudinally forward of the aft-facing step of the second wall. The separation line is a line or zone which separates the supersonic air stream from a very low velocity air stream.

In another embodiment, the scramjet combustor of the invention has variable geometry for varying the step separation parameter which includes a mechanism for varying the longitudinal distance between the aft-facing steps during supersonic flight.

There is also provided a method for operating the scramjet combustor of the invention, with reference to the step separation parameter, which includes sensing a change in any of the input conditions of inlet Mach number and fuel-air ratio and varying the longitudinal distance between the aft-facing steps so as to keep generally between the above-described minimum and maximum values.

In yet another embodiment of the invention, the scramjet combustor has two spaced-apart, generally opposing, and generally longitudinally extending walls, with at least one of the walls having an aft-facing step, the combustor also having a fuel injector positioned proximate the step, wherein the scramjet combustor of the invention, optimized for the fuel injection angle, has the angle which the fuel injector makes with the longitudinal axis, at the scramjet combustor's design inlet Mach number and fuel-air ratio, generally equal to the angle which the separation line makes with the longitudinal axis. Additionally, the fuel injector positioned proximate the step includes a mechanism for varying the angle the fuel injector makes with the combustor's longitudinal axis during supersonic flight. A method of the invention, with reference to the fuel injection angle, includes sensing a change in any of the input conditions of inlet Mach number and fuel-air ratio and varying the fuel injection angle such that the angle which the fuel injector makes with the longitudinal axis is kept generally equal to the angle which the separation line makes with the longitudinal axis.

In a further embodiment of the invention, the scramjet combustor, includes a scramjet combustor housing having two spaced-apart, generally opposing, and generally longitudinally extending walls. At least one of the walls has an aft-facing step, a generally longitudinally extending front portion, a transition portion, and a generally longitudinally extending back portion. The front portion's forward end is attached to the step's transversely outward end, the transition portion's transversely outward terminus is attached to the front portion's aft end, and the back portion's front end is attached to the transition portion's transversely inward terminus.

Yet another method of operating the scramjet combustor of the invention, with reference to the wall separation distance, includes making measurements of inlet Mach number, fuel-air ratio, and inlet pressure level during supersonic flight and varying the transverse distance between the back portion of the combustor housing wall and the housing's longitudinal axis during supersonic flight as a function of the measurements so as to generally maintain a predetermined axial distribution of static pressure and temperature within the combustor.

Several benefits and advantages are derived from the invention. Optimizing the longitudinal step separation distance will optimize shock compression (from the shocks which form at the steps) for better combustion. Too short a distance will not allow a reflected shock (with its added aerothermo compression beyond the air compression limit of the engine inlet) to form from the longitudinally forward step's shock, while too long a distance will not add to the air compression, but does add to the combustor's longitudinal length and hence to its weight and friction drag. Optimizing the fuel injection angle will promote better fuel-air mixing allowing for more efficient combustion within a shorter length combustor. Decreasing the transverse distance between the back portion of the combustor housing's walls will increase the pressure level and reduce the required fuel-air mixing distance, which will improve combustion efficiency.

BRIEF DESCRIPTION OF THE DRAWINGS

The accompanying drawings illustrate a preferred embodiment of the present invention wherein:

FIG. 3 shows the airflow around the longitudinally forward step of FIG. 1 at minimum step separation; and FIG. 4 shows the airflow around the longitudinally forward step of FIG. 1 at maximum step separation.

DETAILED DESCRIPTION OF THE INVENTION

Figure 1:
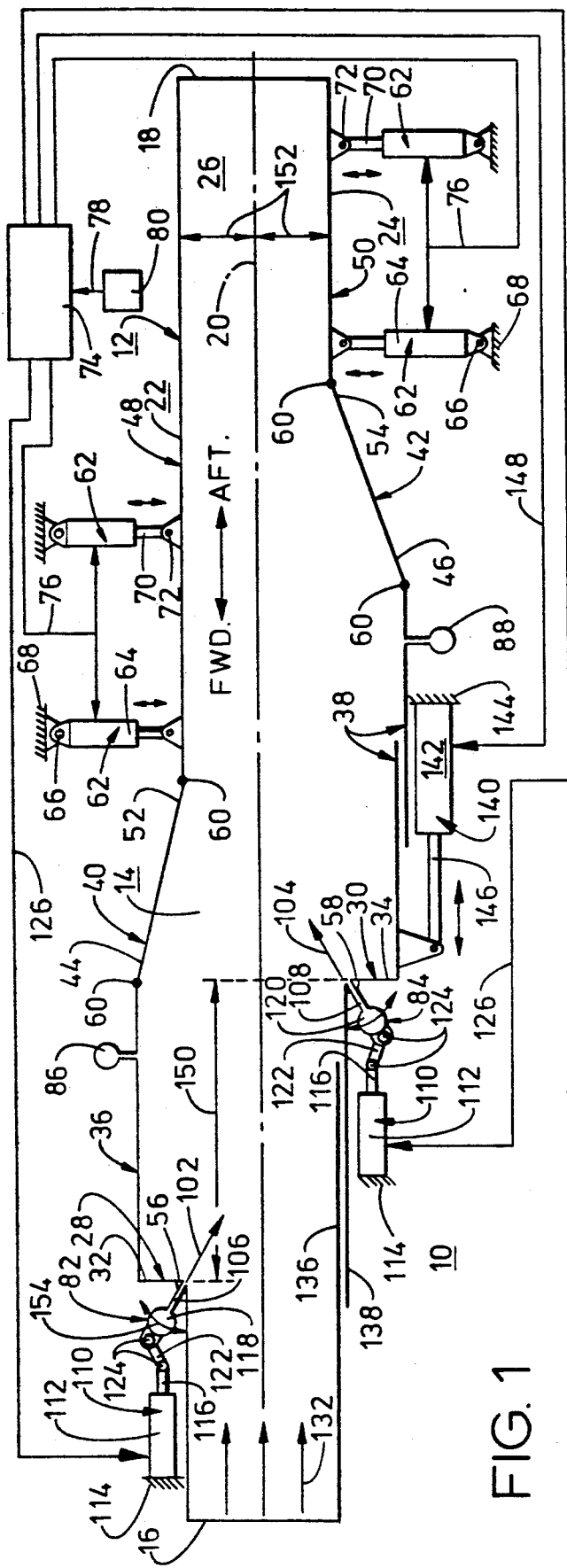
FIG. 1 is a schematic cross-sectional view of a scramjet combustor including apparatus for varying step separation, fuel injection angle, and wall separation.

A preferred scramjet combustor 10, shown in cross section in FIG. 1, includes a rectangular duct housing 12 forming a combustion chamber 14 and having a forward air-inlet orifice 16 communicating with the engine inlet (not shown) and an aft air-outlet orifice 18 communicating with the engine exhaust nozzle (also not shown). The combustor's longitudinal axis 20 is defined by a line joining each orifice's center point (the orifice's "center of mass"). The housing 12 includes two spaced-apart, generally opposing, and generally longitudinally extending wider walls 22 and 24 whose longitudinal edges are connected together by two narrower walls to form a generally rectangular duct-shaped combustion chamber (only one 26 of the two narrower walls is shown in FIG. 1). Each of such wider walls 22 and 24 includes an aft-facing step 28 and 30 with a transversely outward end 32 and 34, although some scramjet combustor applications may require only a single step. Each wider wall 22 and 24 also includes: a generally longitudinally extending front portion 36 and 38 having a forward end attached to the step's transversely outward end 32 and 34, a transition portion 40 and 42 having a transversely outward terminus 44 and 46 attached to the front portion's 36 and 38 aft end, and a generally longitudinally extending back portion 48 and 50 having a front end attached to the transition portion's transversely inward terminus 52 and 54 (such terminus extending towards the longitudinal axis 20). The steps 28 and 30 are located a longitudinal distance 150 apart, and the steps and the transition portions are not limited to planar shape. The back portion 48 and 50 is disposed a transverse distance 152 from the longitudinal axis 20, with the distance from the transition portion's transversely inward terminus 52 and 54 to the longitudinal axis 20 being at least as great as the distance from the step's transversely inward end 56 and 58 to the longitudinal axis 20. The transverse distance for each back portion is chosen such that the design (cruise conditions) inlet Mach number, fuel-air ratio, and inlet pressure level would achieve a predetermined axial distribution of static pressure and temperature within the combustor 10, as can be done by those skilled in the art analytically using supersonic flow relationships and equations and/or empirically through wind tunnel and/or other laboratory testing. The required mixing distance is reduced by having the back portions 48 and 50 of the wider walls 22 and 24 closer together.

Means are provided for adjusting the transverse distance of the larger wall's back portion 48 and 50 from the longitudinal axis 20 during supersonic flight. Preferably such means include hinged terminus attachments 60 for the transition portion 40 and 42 together with a pair of powered cylinders 62 to transversely move the back portion 48 and 50. The longitudinally spaced-apart powered cylinders 62 have their cylinder portions 64 retained by hinged attachments 66 fixed to a flight vehicle support structure 68 and their piston portions 70 retained by hinged attachments 72 fixed to the back portion 48 and 50. Alternate means include powered cylinders each attached to both back portions outside the housing, as well as other positioning apparatus, as is known to the artisan. It is noted that a sliding seal arrangement could be used to allow the transverse movement of the wider walls 22 and 24 with respect to the narrower walls (such as 26).

Such means may be controlled by an onboard computer 74 which generates an output signal 76 to vary the transverse distance of the back portion 48 and 50 from the longitudinal axis 20 during supersonic flight. Inputs 78 to the computer 74 would include measurements from a sensor array 80 to provide inlet Mach number (defined to be the Mach number of the air at the combustor's air-inlet orifice 16), fuel-air ratio (defined to be the ratio of the weight of fuel injected into the combustor's combustion chamber 14 per unit of time to the weight of the air entering the combustor's air-inlet orifice 16 per unit of time), and inlet pressure level (defined to be the static pressure of the air at the combustor's air-inlet orifice 16). The computer 74 would be programmed, as a function of the measurements, to generally maintain a predetermined axial distribution of static pressure and temperature within the combustor 10, as can be done by those skilled in the art. Such programming would include the previously mentioned supersonic flow relationships and equations and/or empirical data (which may be included in a computer look-up table) from wind tunnel and/or other laboratory testing. An alternate method of control would be, at some longitudinal point, to adjust the transverse distance of the back portion towards the longitudinal axis until combustion occurred along the longitudinal axis or centerline (thereby achieving a desired static pressure and temperature) as can be measured directly with an optical laser spectrometer set to detect the presence of water as a by-product of combustion, thereby detecting that combustion had taken place along the centerline.

The combustor 10 also has a fuel injector 82 and 84 disposed proximate each step 28 and 30 at an acute positive angle 154 (called the fuel injector angle) with respect to the longitudinal axis 20 (supplemental fuel injectors 86 and 88 may be disposed along the front portion 36 and 38 perpendicular to the longitudinal axis 20). During supersonic flight, a separation line 90 and 92 is produced by the step 28 and 30 which line varies in accordance with the inlet Mach number and fuel-air ratio, as is known to those skilled in the art. On the transversely outward side of the separation line 90 and 92, the air is relatively stagnant with a recirculation zone 94 and 96 near the step 28 and 30. On the transversely inward side of the separation line 90 and 92, the air is moving supersonically with a shear zone 98 and 100 (represented by cross-hatching in FIG. 2) near the separation line 90 and 92 itself. The fuel injector angle is set to be generally equal to the angle which the separation line makes with the longitudinal axis at the design (cruise conditions) inlet Mach number and fuel-air ratio, as can be determined by those skilled in the art analytically using supersonic flow relationships and equations and/or empirically through wind tunnel and/or other laboratory testing. By injecting the fuel 102 and 104 into the shear zone 98 and 100 along the separation line 90 and 92, better fuel-air mixing is achieved.

The scramjet combustor 10 further includes means for varying the fuel injector angle during supersonic flight. Preferably such means include the fuel injector's outlet nozzle 106 and 108 rotatably disposed in the step 28 and 30 together with a powered cylinder 110 having its cylinder portion 112 fixed to a flight vehicle support structure 114 and its piston portion 116 rotatably attached to the fuel injector's base 118 and 120 through a connecting link 122 having hinged end attachments 124. Alternate means include the fuel injector's base having a pin disposed in a curved track with a powered cylinder for pin movement, as well as other angle positioning apparatus, as is known to the artisan.

Such means may be controlled by the onboard computer 74 which generates an output signal 126 to vary the fuel injector angle during supersonic flight as a function of the step's separation line 90 and 92 formed during supersonic flight for input conditions of inlet Mach number and fuel-air ratio. Inputs 78 to the computer 74 would include such measured input conditions from the sensor array 80. The computer 74 would be programmed, as a function of the measurements, to vary the fuel injection angle during supersonic flight, when a change in any of the input conditions is sensed, such that the fuel injector angle is kept generally equal to the angle which the separation line 90 and 92 makes with the longitudinal axis 20, as can be done by those skilled in the art. Such programming would include the previously mentioned supersonic flow relationships and equations and/or empirical data (which may be included in a computer look-up table) from wind tunnel and/or other laboratory testing. An alternate method of control would be to directly measure the separation line angle optically from a shadowgraph, created using a high intensity light source, and then to adjust the fuel injector angle to be equal to the measured value.

Figure 2:
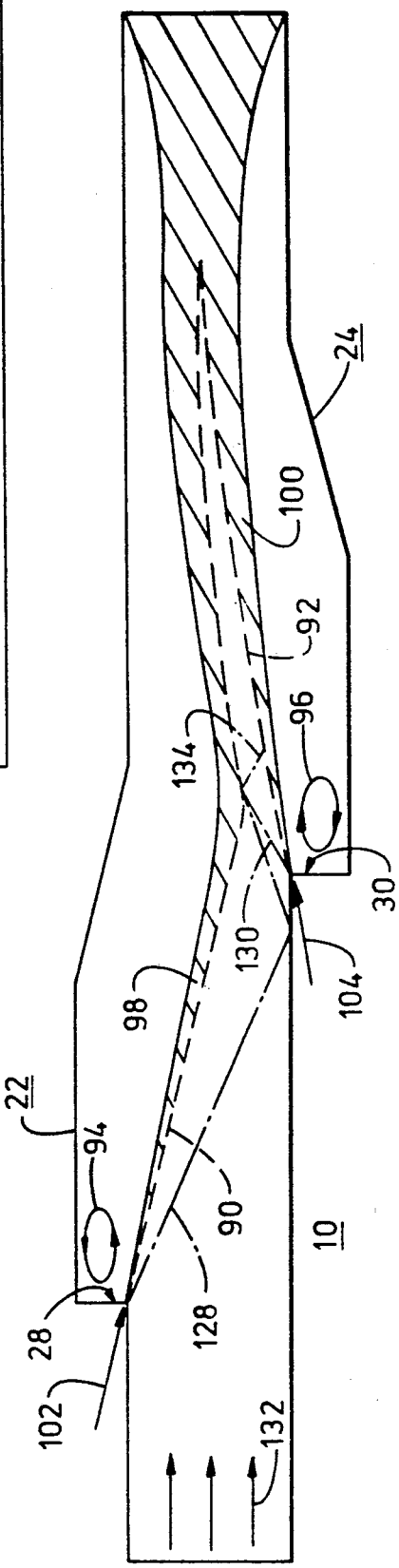
FIG. 2 is a schematic cross-sectional view showing the airflow inside the combustor housing of FIG. 1 during supersonic flight.

As seen from FIG. 2, during supersonic flight each step 28 and 30 produces a shock 128 and 130, as well as a separation line 90 and 92, and such shock and separation line are a function of the inlet Mach number and the fuel-air ratio, as is known to those skilled in the art. With the unfueled supersonic air flow 132 confined by the separation lines 90 and 92, with combustion essentially limited to the shear zone 98 and 100 near the separation line 90 and 92, and with the close-together back portions 48 and 50 of the wider walls 22 and 24 pushing the separation lines 90 and 92 close together, the air flow is seen to be compressed and combustion is seen to occur transversely across essentially the entire air stream. This desirable result gives more efficient combustion and a shorter combustor length, the improvement being unattainable in the prior art.

To optimize shock compression, the longitudinal distance between the two steps 28 and 30 is chosen to be between a minimum and a maximum value. At the minimum value, for a design inlet Mach number and fuel-air ratio, the shock 128 of the longitudinally forward step 28 of the corresponding first 22 of the wider walls will strike the second of the wider walls 24 proximate and longitudinally forward of that wall's longitudinally aft step 30 as shown in FIG. 3. At the maximum value, for a design inlet Mach number and fuel-air ratio, the shock 128 of longitudinally forward step 28 will reflect off the second of the wider walls 24 and then reflect off the longitudinally forward step's separation line 90 as an expansion fan whose initial expansion wave 134 will strike the second 24 of the wider walls proximate and longitudinally forward of the aft step 30 as shown in FIG. 4. The minimum and maximum values for the design (cruise conditions) inlet Mach number and fuel-air ratio can be determined by those skilled in the art analytically using supersonic flow relationships and equations and/or empirically through wind tunnel and/or other laboratory testing. Preferably, the longitudinal distance is chosen to be generally equal to the minimum value. As the air flow crosses a shock, it is compressed because its Mach number decreases and its static pressure increases.

The scramjet combustor 10 additionally includes means for varying the longitudinal distance 150 between the steps 28 and 30 during supersonic flight. Preferably such means include the longitudinally aft step's 30 larger wall 24 having a longitudinally overlapping section with an inner wall portion 136 extending longitudinally forward toward the combustor's air-inlet orifice 16 and with an outer wall portion 138 extending longitudinally aft toward the aft step 30. Such means also include a powered cylinder 140 for that larger wall's 24 front portion 38. The generally longitudinally disposed powered cylinder 140 has its cylinder portion 142 fixed to a flight vehicle support structure 144 and its piston portion 146 fixed to the front portion 38 of the aft step's 30 larger wall 24. Alternate means include a rack and pinion arrangement for the front portion, as well as other positioning apparatus, as is known to the artisan.

Such means may be controlled by the onboard computer 74 which generates an output signal 148 to vary the longitudinal distance between the steps 28 and 30 during supersonic flight as a function of input conditions of inlet Mach number and fuel-air ratio. Inputs 78 to the computer 74 would include such measured input conditions from the sensor array 80. The computer 74 would be programmed, as a function of the measurements, to vary the longitudinal distance between the steps 28 and 30 during supersonic flight, when a change in any of the input conditions is sensed, such that the longitudinal step separation distance would be generally between the previously described minimum and maximum values (and preferably be generally equal to the minimum value). Such programming would include the previously mentioned supersonic flow relationships and equations and/or empirical data (which may be included in a computer look-up table) from wind tunnel and/or other laboratory testing. An alternate method of control would be to directly optically measure the point where the longitudinally forward step's shock strikes the second of the larger walls from a shadowgraph, created using a high intensity light source, and then to adjust the step separation so that the strike point falls within those strike points corresponding to the minimum and maximum step separation values.

It is noted that the invention provides a more efficient scramjet combustor, one which utilizes variable step separation distance for series type aerothermo (shock) compression, variable fuel injection angle for improved fuel-air mixing, and variable transverse wall separation for reduced fuel-air mixing length.

The foregoing description of a preferred embodiment of the invention has been presented for purposes of illustration. It is not intended to be exhaustive or to limit the invention in the precise form disclosed (such as, for example, a particular number of steps or a particular shape for a step or a transition portion), and obviously many modifications and variations are possible in light of the above teaching.

I claim:

1. A scramjet combustor having a longitudinal axis and two spaced-apart, generally opposing, and generally longitudinally extending walls, with each of said walls having an aft-facing step, said steps being a longitudinal distance apart, wherein the improvement comprises means for varying said longitudinal distance during supersonic flight.

2. The scramjet combustor of claim 1, wherein the longitudinally forward step of the corresponding first of said walls has a shock and a separation line during said supersonic flight and wherein, for at least a portion of said supersonic flight, said means keeps said longitudinal distance generally between a minimum and a maximum value, said minimum value chosen such that said shock will strike the second of said walls proximate and longitudinally forward of the longitudinally aft step, and said maximum value chosen such that said shock will reflect off the second of said walls and then reflect off said separation line as an expansion fan having an initial expansion wave which will strike the second of said walls proximate and longitudinally forward of the longitudinally aft step.

3. The scramjet combustor of claim 2, wherein for at least a portion of said supersonic flight, said means keeps said longitudinal distance generally equal to said minimum value.

4. A scramjet combustor having a longitudinal axis and two spaced-apart, generally opposing, and generally longitudinally extending walls, with each of said walls having an aft-facing step, said steps being a longitudinal distance apart, said combustor also having a fuel injector disposed proximate a said step at an acute positive angle with respect to said longitudinal axis, and wherein the improvement comprises:
(a) means for varying said longitudinal distance during supersonic flight;
(b) means for varying said fuel injector angle during supersonic flight; and
(c) means for varying the transverse distance between said walls during supersonic flight.

* * * * *